No. 848,842. PATENTED APR. 2, 1907.
L. G. McKAM.
SAW TOOTH.
APPLICATION FILED JUNE 27, 1906.
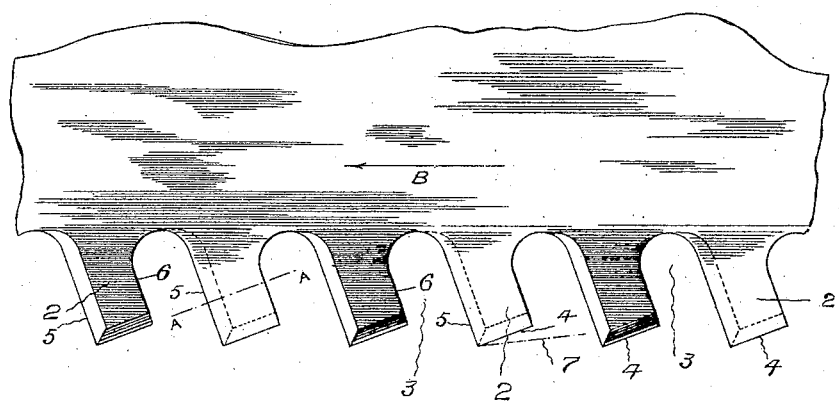
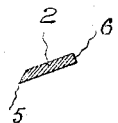
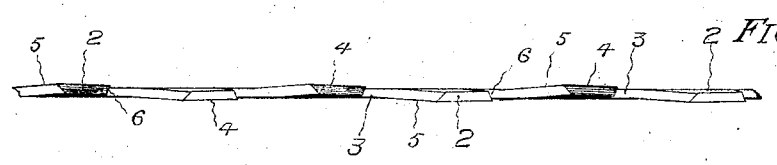
WITNESSES.
John T. Schrott
F. C. Gibson.
INVENTOR.
LAWRENCE G. McKAM.
per
Fred G. Dieterich
Attorney.

UNITED STATES PATENT OFFICE.

LAWRENCE G. McKAM, OF NEW WESTMINSTER, BRITISH COLUMBIA, CANADA.

SAW-TOOTH.

No. 848,842.     Specification of Letters Patent.     Patented April 2, 1907.

Application filed June 27, 1906. Serial No. 323,716.

*To all whom it may concern:*

Be it known that I, LAWRENCE G. McKAM, a citizen of the Dominion of Canada, residing at the city of New Westminster, in the Province of British Columbia, Canada, have invented a new and useful Saw-Tooth, of which the following is a specification.

My invention relates to an improved saw-tooth, which, although particularly designed for a crosscut hand-saw, is equally applicable with slight modifications to a rip-saw or to a circular saw for either purpose.

The advantages which I claim for this tooth are that it is simple to form and grind, in the first instance, will wear longer, is not readily injured, and is easily maintained in good condition. Further, it is efficient in the performance of its work and as a hand-saw does not bite in, but has a slicing action, which is favorable to smooth cutting.

The particular form of the tooth and the manner of grinding it is fully described in the following specification, reference being made to the drawings by which it is accompanied, in which—

Figure 1 is a side elevation of a series of teeth; Fig. 2, a plan of the same, and Fig. 3 a cross-section of a tooth on the line A A in Fig. 1.

The tooth 2 is of simple pillar form, the front and back edges 5 and 6 being parallel, and in contradistinction to the usual practice is raked backward from the direction of the cutting movement of the saw, which direction is indicated by the arrow B. The amount of this rake is approximately seventy degrees for crosscutting; but the angle may be greater—that is, the rake may be less for a rip-saw.

The gullet 3 is about the same in width as the tooth, and the top 4 of each tooth is approximately normal to the front edge 5; but the angle which the top makes with the front edge 5 may be greater than as shown in Fig. 1 so long as sufficient clearance is afforded.

The front edge 5 and top 4 of each tooth are ground to a moderate bevel, approximately forty-five degrees, to the opposite faces of the saw-blade in adjacent teeth, as shown in Fig. 2, the back edge 6 being left square (see Fig. 3) to retain all available strength in the tooth.

A moderate amount of set is given to the teeth to afford clearance to the saw-blade.

A saw is thus provided which is simple and cheap in the formation of the teeth, and as the edges are only moderately acute they will stand up well in wear and will not be seriously injured when they encounter foreign material in their cut. The backward rake of the teeth prevents them from biting in and gives a slicing cut, which I have found favorable to smooth and easy work.

Having now particularly described my invention and the manner of its operation, I hereby declare that what I claim as new, and desire to be protected in by Letters Patent, is—

1. In a saw; parallel pillar-teeth backwardly raked fro mthe line of the direction of cut, the top of each tooth being angled from the front face thereof to afford the necessary amount of clearance, and the top and cutting-face of each adjacent tooth ground to a moderate bevel to opposite sides of the blade.

2. In a saw; parallel pillar-teeth backwardly raked from the line of direction of cut at an angle of approximately seventy degrees, the top of each tooth being approximately normal to the cutting-face, and the top and cutting-faces of adjacent teeth beveled to an angle of approximately forty-five degrees to offer a cutting edge on alternate sides of the saw-blade.

3. In a saw; parallel pillar-teeth backwardly raked from the line of direction of cut at an angle of approximately seventy degrees, the tops of such teeth being approximately normal to the cutting-faces thereof, the tops and cutting-faces of the teeth being beveled to an angle of about forty-five degrees so as to offer a cutting-edge on adjacent teeth to opposite sides of the saw-blade, the backs of the teeth being square to the face of the saw-blade, the gullets about equal to the width of the teeth, and the adjacent teeth "set" to opposite sides of the blade a sufficient amount to afford clearance for the blade.

In testimony whereof I have signed my name to this specification in the presence of two subscribing witnesses.

LAWRENCE G. McKAM.

Witnesses:
    ROWLAND BRITTAIN,
    ELLICE WEBBER.